United States Patent [19]
Grimmett et al.

[11] 3,888,733
[45] June 10, 1975

[54] FLUIDIZED-BED NUCLEAR REACTOR

[75] Inventors: Earl S. Grimmett; Jay F. Kunze, both of Idaho Falls, Idaho

[73] Assignee: The United States of America as represented by the United States Energy Research and Development Administration, Washington, D.C.

[22] Filed: Dec. 21, 1973

[21] Appl. No.: 427,391

[52] U.S. Cl. ............... 176/52; 176/45; 176/91 SP; 176/60
[51] Int. Cl. ............................................. G21c 3/44
[58] Field of Search ......... 176/45, 52, 91 SP, 58–60

[56] References Cited
UNITED STATES PATENTS

| | | | |
|---|---|---|---|
| 2,975,116 | 3/1961 | Daniels | 176/45 |
| 3,046,212 | 7/1962 | Anderson | 176/45 |
| 3,058,897 | 10/1962 | Slack et al. | 176/45 |
| 3,122,595 | 2/1964 | Oxley | 176/91 SP |
| 3,135,665 | 6/1964 | Koutz et al. | 176/91 SP |
| 3,284,309 | 11/1966 | Murphree | 176/45 |
| 3,285,822 | 11/1966 | Ackroyd | 176/65 |
| 3,287,910 | 11/1966 | Silverstein | 176/45 |

FOREIGN PATENTS OR APPLICATIONS

| | | | |
|---|---|---|---|
| 749,064 | 5/1956 | United Kingdom | 176/45 |
| 1,159,807 | 7/1969 | United Kingdom | 176/45 |

*Primary Examiner*—Harvey E. Behrend
*Attorney, Agent, or Firm*—John A. Horan; Arthur A. Churm; Hugh W. Glenn

[57] ABSTRACT

A reactor vessel contains a fluidized-bed region of particulate material including both a neutron-moderating and a fertile substance. A gas flow including fissile material passes through the vessel at a sufficient rate to fluidize the particulate material and at a sufficient density to support a thermal fission reaction within the fluidized-bed region. The high-temperature portion of a heat transfer system is located within the fluidized-bed region of the reactor vessel in direct contact with the fluidized particles. Heat released by fission is thereby transferred at an enhanced rate to a coolant circulating within the heat transfer system. Fission products are continuously removed from the gas flow and supplemental fissile material added during the reactor operation.

1 Claim, 2 Drawing Figures

FLUIDIZED-BED NUCLEAR REACTOR

CONTRACTUAL ORIGIN OF THE INVENTION

The invention described herein was made in the course of, or under, a contract with the U.S. Atomic Energy Commission.

BACKGROUND OF THE INVENTION

This invention relates generally to the design of nuclear reactors. It has particular application to the design of power reactors in which thorium is transmuted into a fissionable uranium isotope.

Most nuclear reactors contain fissionable fuel in solid form fabricated into fuel elements, for instance, of cylindrical or tubular shape. An inert cladding is superposed over the fuel for containment of the fissile material as well as radioactive fission products. During operation, these fuel elements are continuously cooled and monitored to prevent melting or other damage to the cladding or fuel.

Periodically, the reactor must be shut down and the fuel elements removed for reprocessing in order to chemically separate the fission products from the fissile material. The residual and newly bred fissionable material is thereafter recovered and refabricated into new fuel elements. The refabrication of fuel elements is a costly process due in part to the necessity for remote operations within shielded facilities. Even if a complete chemical separation of both uranium and plutonium from the radioactive fission products can be accomplished, gamma activity from the daughters of $U^{232}$ and $Pu^{241}$ will require that shielding be used during fabrication.

Prior investigations have been conducted using fluidized beds in the design of nuclear power reactors. In these past studies, the fuel was formed of fairly large pellets or particles. These particles, like the fuel elements mentioned above, required periodic removal from the reactor for reprocessing. Heat generated within the nuclear fuel particles was transferred to the fluidizing medium which in turn transferred the heat produced to a secondary fluid in a heat exchanger outside of the reactor. Unfortunately, the rate of heat transfer within a given volume of the reactor core was too low to provide a power density which was competitive with conventional-type reactors. Moreover, the flow velocities needed to obtain the desired heat transfer characteristics were often far above the minimum fluidizing velocity and resulted in rapid erosion of the particles.

SUMMARY OF THE INVENTION

Therefore, in view of the limitations of the prior art, it is an object of the present invention to provide an improved nuclear reactor having a fluidized bed.

It is a further object to provide a fluidized-bed, nuclear reactor with improved heat transfer characteristics.

It is also an object of the present invention to provide a reactor which avoids the use and resultant disadvantages of solid fissile fuels.

It is a further object of the present invention to provide a method of breeding fissile material within a nuclear reactor.

In accordance with the present invention, a gas-pumping system circulates gaseous, fissile material through a reactor vessel. The vessel contains particles of fertile and moderating substances which are slightly lifted by the flow of fissile material to form a fluidized-bed region. A sufficient density of fissile material is maintained within the fluidized-bed region to support a fission reaction with thermal neutrons. The high-temperature portion of a heat transfer system is exposed to the fluidized material within the reactor vessel and heat is thereby transferred into a coolant contained within the system. Heat from the coolant is recovered for utilization in another portion of the heat transfer system outside the reactor vessel.

BRIEF DESCRIPTION OF THE DRAWINGS

The present invention is illustrated in the accompanying drawings wherein.

DETAILED DESCRIPTION OF THE PREFERRED EMBODIMENT

Figure 1:
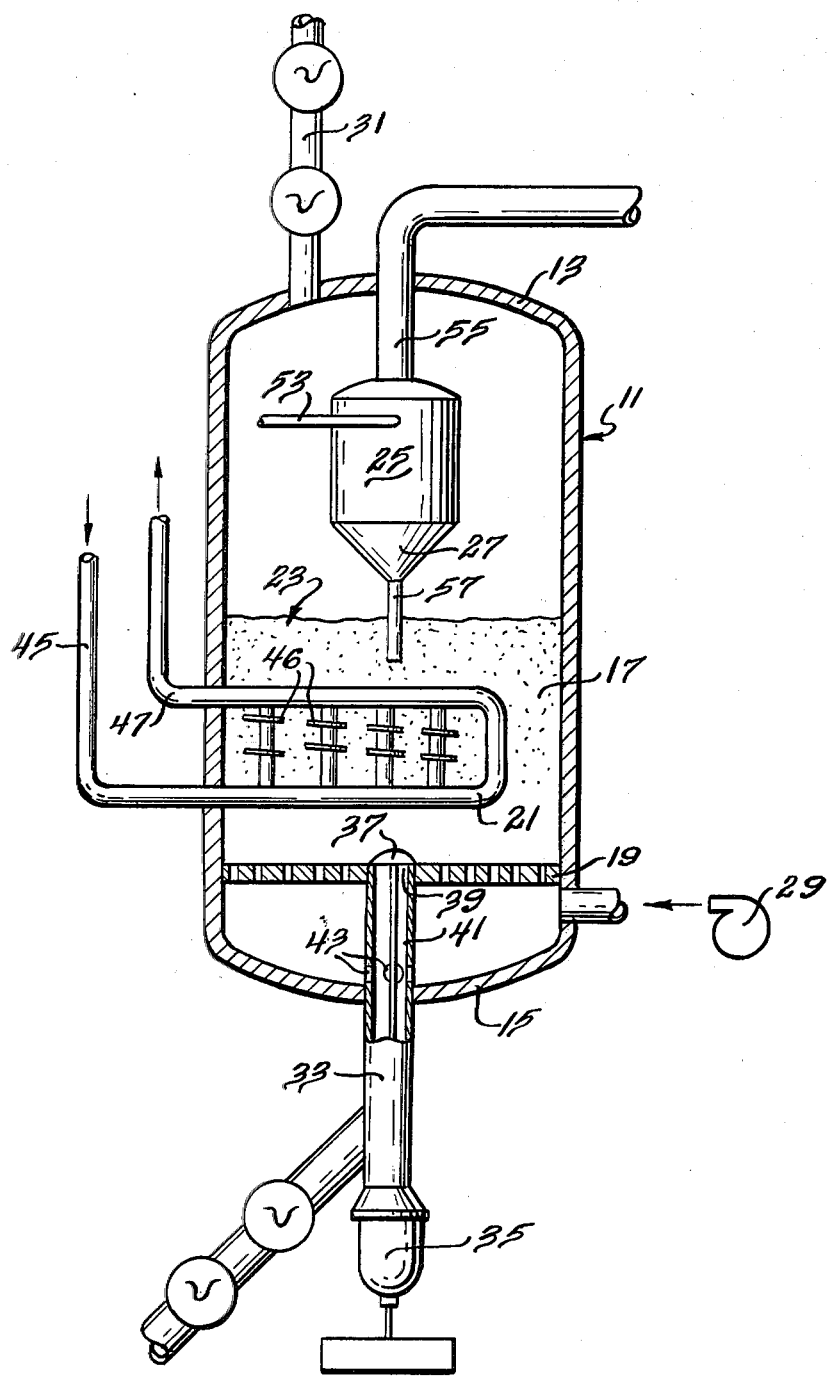
FIG. 1 is an elevation view in cross section of a nuclear reactor vessel.

Referring now to FIG. 1 where a reactor vessel 11 is shown with a cylindrical body and dished heads 13 and 15. Vessel 11 includes a bed of particulate material 17 located on and above a horizontal grating 19 that is supported across the lower portion of the vessel. Within the bed, a heat exchanger 21 is positioned in intimate contact with particulate material 17. The particulate material is fluidized by a circulating gas flow to form a fluidized-bed region 23 surrounding the heat exchanger 21. The gas flow passes through the fluidized bed into a cyclone separator 25 and recirculates through a process loop to a blower 29 and back into the lower portion of vessel 11 below grating 19.

The reactor vessel 11 is made sufficiently strong to contain relatively high internal pressures, for instance, of about 40 atmospheres or more. The dished heads are provided with valved ports as indicated at 31 and 33 which penetrate the upper and lower heads respectively for admitting and discharging the particulate material. Double valves are used on each port to avoid a direct opening into the interior of the reactor vessel. The lower valved port 33, in addition, includes a long stem poppet valve 35. The plug 37 of poppet valve 35 is disposed over a relatively large opening 39 in grating 19. Opening 39 is of sufficient size to allow particulate material 17 to pass into port 33 when plug 37 is raised. A conduit section 41 interconnects opening 39 with port 33 and includes peripheral slots 43 flush with the inner surface of dished head 15 for admitting particles into section 41. Ordinarily only fine particles will fall into dished head 15 as the spacings within grating 19 are sized to retain the particulate material while allowing the upwardly flowing gas to pass.

Heat exchanger 21 is in intimate contact with particulate material 17 in fluidized-bed region 23. The heat exchanger can comprise various arrangements for cooling the reactor core and transferring heat to a means for utilization. As shown, heat exchanger 21 is a manifold conduit or tubing arrangement with an inlet 45 and an outlet 47 for circulating coolant flow. Fin tubing 46 is employed to increase the exposed heat transfer area.

Cyclone separator 25 is supported in the upper portion of vessel 11 above the fluidized-bed region 23. This separator comprises a closed cylindrical vessel with a conical bottom 27 and a tangential entry 53 penetrating the upper peripheral wall of separator 25 to create a swirling action as the gas flow enters the separator. A gas outlet conduit 55 is connected through the center portion of separator top while an outlet conduit 57 for solid particles is provided at the lower apex of the conical bottom 27. Conduit 57 extends from separator 25 into the fluidized-bed region 23 for return of the entrained particulate material. Gas discharged through outlet conduit 55 is passed outside the reactor vessel for reprocessing and recirculating through blower 29 into the lower portion of reactor vessel 11.

The gaseous, fissile material circulating through the reactor vessel will, for the most part, comprise $^{233}UF_6$ or another gas, e.g. $^{239}PuF_6$, $^{235}UF_6$, which includes a fissionable isotope. It is preferable that nonfissionable diluents be excluded from this gas to facilitate obtaining a critical mass. Making the system critical with a gaseous fuel is difficult. In order to obtain adequate microscopic cross sections for the fuel, the gaseous, fissile material is pressurized, the advantage is taken of the high interaction cross section at low energies. Low-energy neutrons for this purpose are provided through use of a moderator.

Particulate material 17 within the fluidized-bed region 23 includes a moderator substance, for instance, graphite or beryllium oxide. A fertile substance such as $^{232}ThO_2$ or $^{238}UO_2$ can also be included for breeding additional fissile material. A homogeneous mixture of moderator and fertile material will result in excessive parasitic capture before the neutrons reach thermal energy. Therefore, a substantial quantity of fertile material can be included within the fluidized-bed region in lump form so that self shielding will isolate the inner core of fertile material from the neutron flux.

A particularly suitable form of particulate material 17 includes particles having an inner core of $^{232}ThO_2$ and an outer coating of graphite moderator. A typical particle will have about a 200 microns thoria core and about a 200 microns thick outer coating of graphite. About 50,000 kilograms of these particles in about a 1 to 2 weight proportion of thoria to graphite are fluidized within about 60 cubic meters of reactor volume. This volume represents a space of slightly more than 4 meters in height and in diameter. To obtain criticality these particles are fluidized with $^{233}UF_6$ gas at about 40 atmospheres pressure and about 25 to 30 centimeters per second flow rate. A reactor containing such a fluidized-bed region is capable of providing about 6500 megawatts of thermal power.

Figure 2:
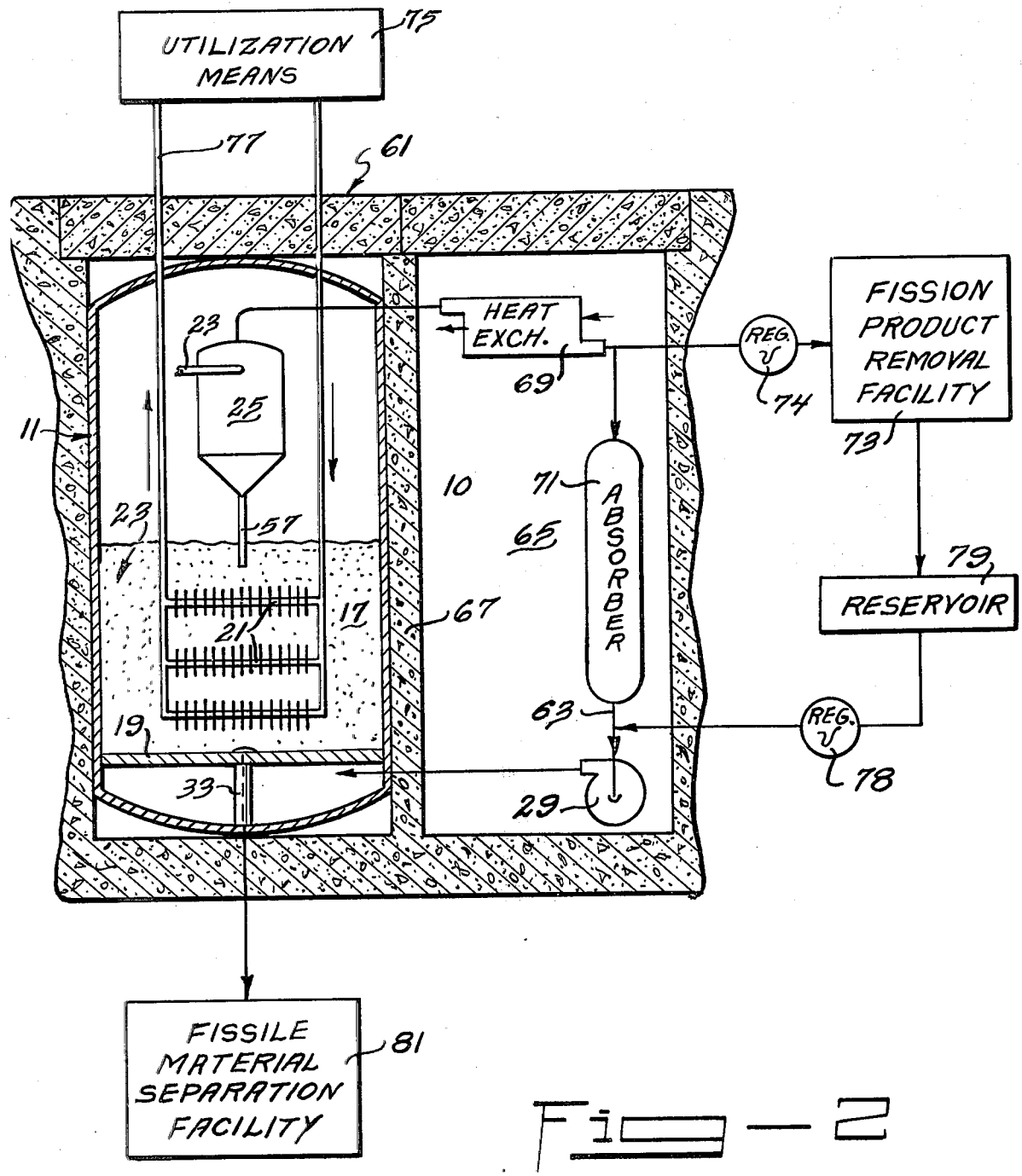
FIG. 2 is a schematic view of a nuclear reactor including the vessel of FIG. 1 with accompanying facilities shown diagrammatically.

Referring now to FIG. 2 where the operation of the fluidized-bed reactor can be more completely described, reactor vessel 11 is shown shielded and supported within structure 61. A process loop 63 including blower 29 is contained within a separate chamber 65 of structure 61. The gaseous, fissile material is circulated from bottom to top through reactor vessel 11 and at least a portion of the gas is recirculated through process loop 63. The loop is shielded from the reactor vessel by a partition 67 so that the various components, e.g. blower 29, can be serviced after removing radioactive materials from this portion of the reactor process.

The components within process loop 63 include a heat exchanger 69 and an absorber unit 71. The heat exchanger can be of conventional type such as a containment shell for the flow of fissile gas and tubes for passing a coolant separate from the gas. The heated coolant flow (not shown) can be the same fluid as used in heat exchanger 21 and can be combined with that fluid for energy utilization. By providing sufficient area and coolant flow in exchanger 69, the flow of gaseous, fissile material can be used to remove all of the heat generated by the reactor should the coolant flow in heat exchanger 21 be disrupted.

The flow of gas leaving heat exchanger 69 is divided into a major fraction which enters absorber unit 71 and a minor fraction which passes to a fission product removal facility 73. A reservoir 79 accumulates the reprocessed $UF_6$ gas and two regulator valves 74 and 78 or other suitable means control the amount of gas reprocessed and returned to process loop 63.

Facility 73 is constructed in accordance with well-known principles of the art of chemically reprocessing radionuclides. Reference is made to the *Reactor Handbook*, 2d. Ed., Vol. 2, "Fuel Reprocessing," 1961 (Interscience Publishers, Inc., New York 1961) where various processes and facilities for separating fission products from fissile fuel are described.

In addition to facility 73 for processing the gaseous, fissile material, a fissile material separation facility 81 is provided for processing particulate material 17 removed through port 33 to recover the newly bred fissile material. In reactor operations which use $^{232}Th$ as a fertile substance to breed $^{233}U$ within the particulate material, a conventional, chemical process for the separation of uranium from thorium can be employed. Typical aqueous processes for this separation are described in *Reactor Handbook*, Vol. 2, cited above, pp. 209–226 and 304–305. The recovered uranium containing a high proportion of $^{233}U$ isotope can be converted to $UF_6$ gas for replenishing the gaseous fissile material and for fueling other operations.

The coolant circulating through heat exchanger 21 is heated to a high temperature of perhaps 500° to 1000°C. as a result of the fission reaction within the fluidized-bed region 23. The heated coolant, possibly combined with the coolant flow from heat exchanger 69, flows in a closed cycle 77 through both the heat exchanger 21 and a utilization means 75. Means 75 can comprise a turbine-generator combination or other facility for converting heat to electrical power. Also included within means 75 will be the necessary pumps, compressors, blowers, condensers, coolers and other mechanisms or units for completing a power generation cycle.

A number of suitable coolants can be employed for transferring heat from the fluidized-bed region 23 to utilization means 75. One particularly suitable coolant is helium-4 gas. Due to its small neutron cross section, this gas will not readily absorb neutrons needed to maintain criticality within the reactor or be transmuted into long-life radioisotopes. However, since some radioisotopes may be formed from the helium or from impurities within this gas, it may be desirable to include a second heat exchanger within the system to produce steam from the hot, helium gas. An alternate coolant for heat exchanger 21 is boiling water for the production of steam. As in conventional boiling-water reactors, a secondary heat exchanger would be required to isolate the water subjected to the neutron flux within the reactor core.

The materials used in heat exchanger 21 are selected for both high-temperature durability and low cross section for neutron absorption. A number of materials are available that will withstand the reactor operating temperature of up to 1100°C.; however, only a few of these materials also have sufficiently low neutron-absorption capability to permit breeding of more fissile material than is utilized. Conversion ratios, that is moles of fuel bred to moles of fuel burned, are obtained for a number of heat-transfer-medium materials and tabulated in the table below. The values are obtained for a reactor including $^{233}UF_6$ gas at 40 atmospheres pressure flowing through a bed with graphite-coated thoria particles in a volume of about 60 cubic meters having 1.9 centimeter heat exchanger tubes spaced on 5.1 centimeter centers.

CONVERSION RATIOS FOR A LARGE FLUIDIZED-BED REACTOR

| Heat Exchanger Tube Material | Approximate Conversion Ratio |
| --- | --- |
| Zircaloy (1.5% Sn, 0.15% Fe, 0.10 Cr and 0.05% Ni) | 1.1 |
| Niobium (Columbium) | 0.9 |
| Molybdenum | 0.4 |
| Stainless Steel Type 304 | 0.2 |

It can be seen from the above table that only through use of zircaloy can more $^{233}U$ be bred than is burned in the reactor operation. Niobium gives a marginal conversion ratio while molybdenum and stainless steel give rather small conversion ratios. If beryllium oxide is used as moderator and as the coating on the thoria particles, these other materials may become feasible choices for the heat exchanger.

In one manner of operating the fluidized-bed reactor of the present invention, a flow of $^{233}UF_6$ gas is circulated upwardly through reactor vessel 11 through fluidized-bed region 23. A gas flow that is slightly in excess of the incipient fluidizing velocity is provided to produce a condition of aggregative fluidization. For instance, a gas flow of less than 30 cm/sec can be used in a bed with about 250 to 600 microns diameter particles having a density of about 2.6 to 3.8 gm/cm³.

Aggregative fluidization is characterized by only a small increase in the bed volume over that found in the bed at rest. The gas passes up through the bed in the form of bubbles, in much the same manner as gases rise in a column of liquid. The bed takes on the appearance of a boiling mixture of gas and solids. The maximum heat transfer rates are nearly obtained when a bed is in a state of aggregative fluidization. It has been found that further increased gas velocities do not appreciably enhance heat transfer to the heat transfer medium but only further expand the fluidized bed and contribute to erosion of the particles.

On leaving the fluidized-bed region 23 the $^{233}UF_6$ gas enters cyclone separator 25 which creates a centrifugal action to force the entrained solid particles of graphite or beryllium oxide coated $^{232}ThO_2$ to the separator periphery and then back into the fluidized bed through conduit 57.

The gas, substantially free of particles, is discharged from the top of the separator vessel and is next cooled from about 800°C. to about 500°C. in heat exchanger 69. The gas discharge is divided into two unequal flow fractions, with the major portion passing through an absorber unit 71. Fission products are absorbed from the gas flow onto an adsorbent such as silica gel or zeolite in unit 71 before recycling the gas back into reactor vessel 11. The minor portion of the gas flow discharged from heat exchanger 69 is processed in the fission product removal facility 73 where substantially all of the fission products are removed and a nearly pure $UF_6$ gas produced. The gas is returned to process loop 63 through reservoir 79 along with any additional gas needed to maintain the required pressure within reactor vessel 11.

The fission reaction within the fluidized-bed region 23 is controlled by regulating the pressure and the flow rate of the $^{233}UF_6$ gas within the fluidized-bed region of the reactor vessel. Since only a small amount of fissile material is in the fluidized-bed region at a given time, the reaction is unlikely to become supercritical or result in a nuclear excursion. Any change in reactivity, in either direction, is offset through adjustment of regulator valves 74 and 78. Opening valve 74 and closing valve 78 will rapidly reduce the pressure of the reactor system and thereby stop the nuclear reaction. During ordinary operations these valves are modulated to provide a constant pressure of about 40 atmospheres within the reactor vessel and thereby control the reaction rate.

It will be seen that the present invention provides an improved nuclear reactor utilizing a fluidized bed of particulate material. The heat exchanger is placed within the fluidized-bed region to give direct contact with the fluidized particles resulting in improved heat transfer. A flow of gaseous, fissile material is used to provide nuclear fuel for the reactor as well as to fluidize the particulate material and provide an auxiliary cooling system. Use of the gaseous fuel avoids many of the inherent disadvantages of solid fuel elements such as the need for discontinuing reactor operations to refuel and for refabricating fuel elements within a shielded facility. The invention also provides a method of breeding fissile material in which the fertile material is fluidized within the reactor vessel to not only enhance heat transfer but also allow easy removal of the particles containing bred fissile products.

The embodiments of the invention in which an exclusive property or privilege is claimed are defined as follows:

1. A fluidized-bed nuclear reactor comprising a reactor vessel having a gas inlet in the lower portion and a gas outlet in the upper portion;
   a mass of composite particles disposed within said reactor vessel, said composite particles having cores of $^{232}ThO_2$ of about 200 microns diameter enclosed within graphite coatings of about 200 microns thickness and being 2.6 to 3.8 gm/cm³ in density;
   a first conduit circuit interconnecting said gas inlet to said gas outlet of said reactor vessel, said circuit having gas-pumping means for circulating gaseous $^{233}UF_6$ upwardly through said reactor vessel at about 40 atmospheres pressure and at an incipient fluidizing velocity of 25 to 30 cm/sec to fluidize said mass of particles in a state of aggregative fluidization in a volume of about 60 cubic meters, wherein a fission reaction is produced, having a heat exchanger within said circuit external to said reactor vessel for cooling said gaseous $^{233}UF_6$ and having absorber means within said circuit for removing fission products from said gaseous $^{233}UF_6$;
   a shunt conduit circuit connected into said first conduit circuit across said absorber means, said shunt conduit circuit including a reservoir and control valve means for controlling the pressure within said reactor vessel, for withdrawing $^{233}UF_6$ gas with fission products at a first location, and for adding $^{233}UF_6$ gas with at least a portion of said fission products removed at a second location downstream of said first location to establish and maintain a fission reaction;

a second conduit circuit for circulating a coolant fluid and removing heat produced by said fission reaction within said reactor vessel, said circuit including a portion comprising tubing of zirconium-based alloy disposed within said reactor vessel at positions submerged within said mass of particles and a portion extending outside said reactor vessel including energy conversion means for removing and utilizing said heat produced.

* * * * *